United States Patent
Gelernter et al.

(10) Patent No.: US 11,196,635 B1
(45) Date of Patent: Dec. 7, 2021

(54) CONNECTION DETECTION AND PREVENTION OF DANGLING CONNECTIONS

(71) Applicant: CYBERPION LTD, Givat Shmuel (IL)

(72) Inventors: Nethanel Gelernter, Givat Shmuel (IL); Jonathan Lebowitsch, Brooklyn, NY (US)

(73) Assignee: CYBERPION LTD, Givat Shmuel (IL)

( * ) Notice: Subject to any disclaimer, the term of this patent is extended or adjusted under 35 U.S.C. 154(b) by 0 days.

(21) Appl. No.: 17/182,264

(22) Filed: Feb. 23, 2021

Related U.S. Application Data

(60) Provisional application No. 63/087,901, filed on Oct. 6, 2020.

(51) Int. Cl.
  *H04L 12/24* (2006.01)
  *H04L 12/26* (2006.01)
  *H04L 12/911* (2013.01)

(52) U.S. Cl.
  CPC .......... *H04L 41/12* (2013.01); *H04L 41/0618* (2013.01); *H04L 43/062* (2013.01); *H04L 43/12* (2013.01); *H04L 47/822* (2013.01); *H04L 47/829* (2013.01)

(58) Field of Classification Search
  CPC ... H04L 41/12; H04L 41/0618; H04L 43/062; H04L 43/12; H04L 47/822; H04L 47/829
  See application file for complete search history.

(56) References Cited

U.S. PATENT DOCUMENTS

| | | | |
|---|---|---|---|
| 6,625,643 B1* | 9/2003 | Colby | H04L 12/1886 709/217 |
| 2003/0046390 A1* | 3/2003 | Ball | H04L 41/12 709/224 |
| 2006/0271677 A1* | 11/2006 | Mercier | H04L 43/0817 709/224 |
| 2011/0072506 A1* | 3/2011 | Law | H04L 63/1416 726/11 |

* cited by examiner

*Primary Examiner* — Kristie D Shingles
(74) *Attorney, Agent, or Firm* — Soroker Agmon Nordman

(57) ABSTRACT

A computerized system for detecting connections in a network, including one or more data collectors configured to collect connection data from the network, one or more connection analyzers configured to analyze the connection data and extract connection dependencies, which include a connecting resource that depends on the existence of a connected resource and a connection type, a connection table that stores the connection dependencies, an interface that is configured to provide access to the connection table to retrieve a list of connecting resources that depend on accessing a given connected resource.

20 Claims, 5 Drawing Sheets

CONNECTION DETECTION AND PREVENTION OF DANGLING CONNECTIONS

RELATED APPLICATIONS

This application claims priority from provisional application No. 63/087,901 filed on Oct. 6, 2020, the disclosure of which is incorporated herein by reference.

FIELD OF THE DISCLOSURE

The disclosure relates to the field of network applications, cyber security threats, attacks and connection detection to gain visibility over the ecosystem of organizations and their IT and to prevent security risks such as dangling connections to an asset and from the asset.

BACKGROUND

Cyber security is the practice of defending data stored in computerized devices, computerized systems and networks, from malicious attacks. The following emerging phenomena have significant deleterious impact on cyber security: (i) cloudification which is the usage of cloud computing; (ii) increased interconnectivity, where more and more applications and services are delivered jointly by a set of interconnected resources; (iii) Software-defined Everything (SDE) which is how virtualization and abstracting workloads from the underlying hardware can be used to make Information Technology (IT) infrastructures more flexible and agile; and (iv) cloud providers, such as Amazon Web Services AWS, which offer reliable, scalable, and inexpensive cloud computing services.

Interconnectivity is the phenomenon where assets are running an entity such as a website serving webpages that may be loading content, such as user trackers, ads, images, fonts, scripts and/or articles from several different sources in addition to the website itself. Some of the sources may be loaded via intermediary Content Delivery Networks (CDNs). Additionally, hyperlinks on a webpage may direct to other websites, which also may have multiple sources.

The term "Connections", as used henceforth, is not restricted to describing the occurrence of HTML or other webpage-generating code from one server, referencing a resource on another host. Another category of connections is DNS. Among others, NS, MX and CNAME DNS records all affect connections among Fully Qualified Domain Names (FQDNs). The advent of public clouds and of Content Delivery Networks (CDNs) is bringing with it an explosion in the number and complexity of DNS CNAME records. Nameservers (authoritative or not) that participate in the resolution process, might not be specified in any DNS record of domain, but may also affect the security of the domain.

Cloudification and hyper-virtualization are the phenomena where the embodiments of applications, in their network, computing and storage aspects, are becoming more distributed, virtual, fungible and transitory. These applications are now delivered over software defined virtual infrastructure, as virtual machines, docker images, functions, that are themselves implemented by renting computing resources from cloud providers. The rented computing resources may have an IP address and a domain name. The upshot of the dynamic, virtual nature of this infrastructure, and the way it is consumed, is that at any given time, these virtual entities i.e. rented computing resources may get recreated, renamed, moved, or destroyed.

Therefore, the phenomenon of interconnectivity, where more and more applications and services, which are available through the internet, are aggregations of multiple interconnected sets of sources, may have a deleterious impact on cyber security when combined with the phenomenon of cloudification, because these sources are rented computing resources in the cloud, which may be rented for a short term, thus changing their IP address or domain name.

One upshot of these emerging phenomena is a further explosion of connections as now mappings need to be maintained between the high-level resources that embody these applications and the lower level infrastructure that implements these high-level resources.

Another upshot of these emerging phenomena is the difficulty of maintaining connections among such highly dynamic entities, and correlatively, the prevalence of broken, or dangling connections. Unbeknown to its operator, a resource may have a pointer to an entity that no longer exists.

A computing resource provider is considered a renter and the renting entity is considered a tenant. The existence of such dangling connections is particularly attractive to cybercriminals or hackers when the connected resource is something that is available for rent. If one resource points to an IP address, or to a domain name, and that IP or domain name itself is something that can be taken-over by paying rent (or fee) to a computing resource provider, then that's a way to begin to hack into a system of an organization that has resources with connections to that domain name or IP address.

Any type of dangling connection brings with it its own set of risks of propagating harm to the victim. For example, when a company fails to maintain an ownership on a subdomain name e.g. 'us.mycompany.com', an attacker may rent the subdomain name and host illicit content there, bypassing content restrictions and damaging the victim's brand name. In another example, when attackers take control of a domain name or an IP address that's used in a script inclusion on a victim's website, the attackers can then create their own script, to read and manipulate anything that any user reads or performs in that victim's website.

Accordingly, there is a need for a technical solution to allow both renters, i.e., computing resources providers, and tenants of the computing resources, to detect connections and maintain a list of these connections pointing to any of their resources. On the basis of that list of connections, renters and tenants may assess any risks pertaining to the configuration of that resource, and even before that, assess the risk of releasing computing resources or assets by identifying and maintaining a list of connections of any type to each rented computing resource, i.e. asset.

Such maintained list of connections of any type to each rented asset, together with an assessment of the risk of releasing that asset, would be relevant to either or both the current tenant and the renter. The assessment may be performed based on the fact that when an asset is the target of connections by many other assets, then releasing the asset may be risky for the other assets which may try to retrieve data from a new tenant after the asset has been released.

Connections, and dangling connections, may be understood against a background of how DNS works. In general, the intended target of an internet connection is specified (by user, or by code) using that target's FQDN. An actual host receives a request because it has an IP address that is mapped, directly or indirectly, to that FQDN, by DNS records. When an attacker controls an IP address, the attacker can easily receive internet traffic destined for any FQDN that the DNS maps to that IP address.

Similarly, when an attacker takes over an FQDN, the attacker will receive traffic destined not only for this specific FQDN, but for any other FQDN that has mapping, e.g., a DNS CNAME mapping into the FQDN that the attacker took over. Thus, it is of the outmost importance to know which FQDNs directly or indirectly map to any FQDN or IP address, before it is released. Specifically, as long as an FQDN that belongs to the tenant's domain is mapped via DNS to another FQDN or an IP address, the latter cannot be safely allowed to change hands.

In cases of takeovers, the damage to the servers of target organizations may be devastating, no matter the reason why the cyber-attack has been conducted. Therefore, there is a need for a technical solution for organizations or their Internet Service Provider (ISP) or other data resource providers that may track connections and prevent dangling connections before the servers of the target organizations are attacked.

SUMMARY

There is thus provided, in accordance with some embodiments of the disclosure, a computerized-method and a computerized-system for detecting connections and identifying dangling connections to assets and from assets. The computerized system includes one or more data collectors that are configured to collect data from the network relating to connecting resources that are dependent on connecting to connected resources.

The connection data may be collected actively from the network, for example by searching for connecting resources that reference the connected resource, or the connection data may be collected passively, by collecting data relating to connecting resources that attempt to access the connected resource.

The computerized system further includes one or more connection analyzers that analyze the collected data to extract connection dependencies between connecting resources and connected resources. The dependencies are stored in a connection table and the computerized system includes an interface, which allows a user to access the stored data.

In some embodiments of the disclosure, the computerized system poses as a resource server that an organization wants to remove. The computerized system accepts communication attempts that are intended for the resource server to identify if the domain name and/or IP address of the resource server can be released to a new owner or if this may pose a threat to the organization.

There is thus provided according to an embodiment of the disclosure, a computerized system for detecting connections in a network, comprising:

One or more data collectors configured to collect connection data from the network;

One or more connection analyzers configured to analyze the connection data and extract connection dependencies, which include a connecting resource that depends on the existence of a connected resource and a connection type;

A connection table that stores information about the connections and their dependencies;

An interface that is configured to provide access to the connection table to retrieve a list of connecting resources that depend on accessing a given connected resource.

In an embodiment of the disclosure, the computerized system further comprises a connection verifier that is configured to verify the existence of connecting resources or connected resources listed in the connection table. Optionally, each of the one or more data collectors is configured to collect data from a different type of source. In an embodiment of the disclosure, one data collector collects data from a sniffer monitoring live network traffic. Optionally, one data collector collects data from a log file recorded on a remote server.

In an embodiment of the disclosure, the computerized system is configured to be deployed on a resource server and record connecting resources attempting to connect with the resource server. Alternatively, the computerized system is configured to assume the identity of a resource server and record connecting resources attempting to connect with the resource server. Alternatively, the computerized system is configured to be executed by a virtual machine on a cloud server, assume the identity of a resource server and record connecting resources attempting to connect with the resource server. Optionally, each connection analyzer is configured to parse a different data format.

In an embodiment of the disclosure, each connection analyzer is configured to handle connection data from a different data collector. Optionally, the computerized system is configured to identify dangling connections by posing and accepting communications instead of the given connected resource. In an embodiment of the disclosure, the computerized system is configured to pose as the given connected resource for a preconfigured time period. Optionally, the computerized system is configured to send an alert upon discovering a dangling connection. Alternatively, the computerized system is configured to send an alert reporting dangling connections periodically or after a preconfigured period of time.

There is further provided according to an embodiment of the disclosure, a method of detecting connections with a computerized system in a network, comprising:

Collecting connection data from the network using one or more data collector modules;

Analyzing the connection data with one or more connection analyzer modules and extracting connection dependencies, which include a connecting resource that depends on the existence of a connected resource and a connection type;

Storing the connection dependencies in a connection table;

Providing access to the connection table with an interface to enable retrieving a list of connecting resources that depend on accessing a given connected resource.

There is further provided according to an exemplary embodiment of the disclosure, a non-transitory computer readable medium comprising an executable program to perform the method described above.

BRIEF DESCRIPTION OF THE DRAWINGS

In order for the disclosure, to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

Figure 1:
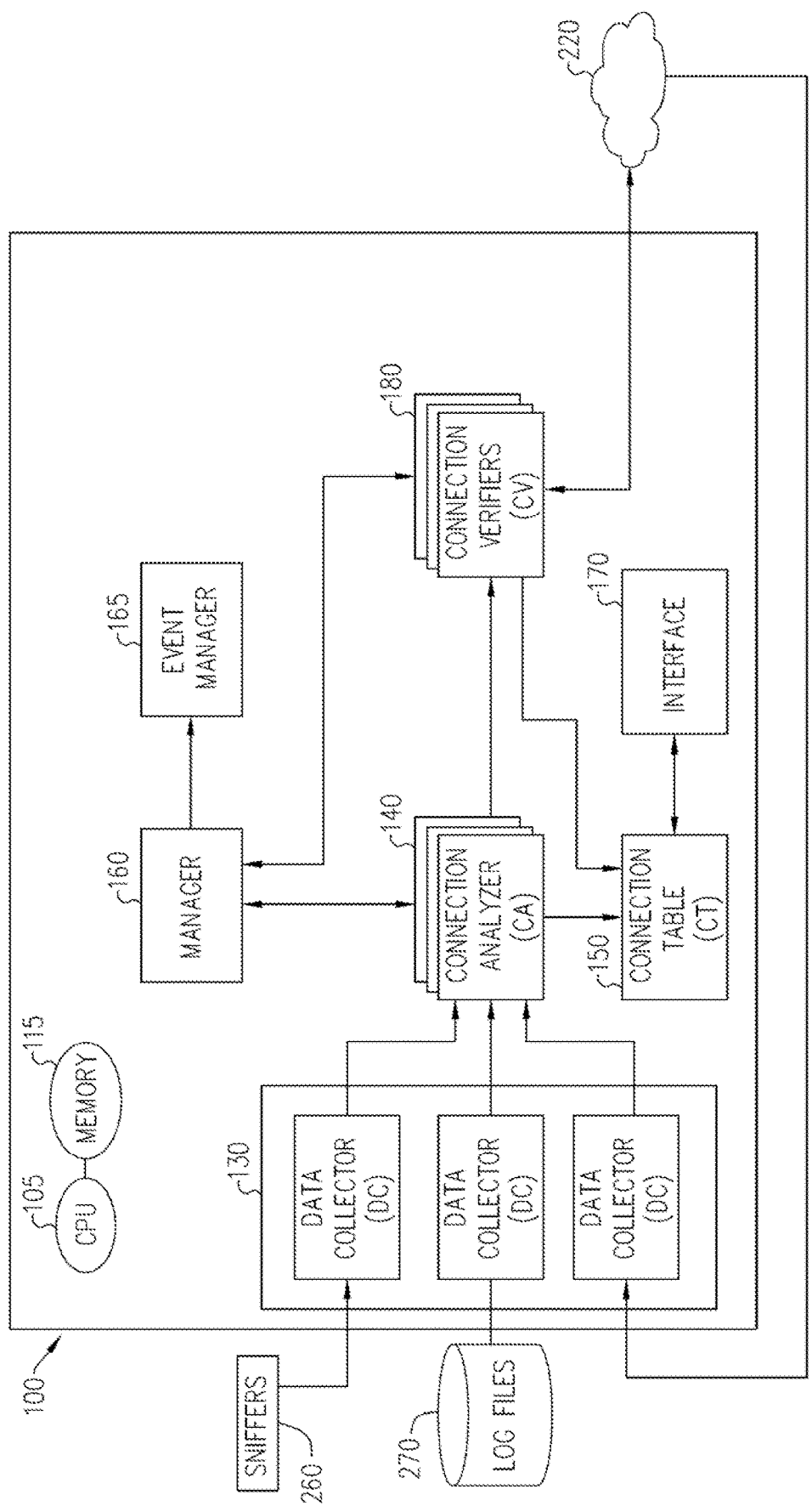
FIG. 1 is a schematic illustration of a computerized-system for detecting network connections, in accordance with an embodiment of the disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Some embodiments of the disclosure may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

The term "service" as used herein refers to an entity accessible from the internet that answers requests from other entities. A service is identified by: (i) a Fully Qualified Domain Name (FQDN), (ii) an internet protocol (e.g., Transmission Control Protocol (TCP) or User Datagram Protocol (UDP)) and (iii) a port.

The terms "resource", and "asset" are interchangeable.

The terms "component" and "module" are interchangeable.

The terms "monitored asset" and "asset of interest" are interchangeable.

The term "asset" as used herein refers to a public IP address, a domain name, a subdomain name or a Fully Qualified Domain Name (FQDN), a network, an account e.g., a cloud account that includes multiple instances, a service (generally uniquely identified by a combination of an FQDN, a port and a protocol. But it may also lack an FQDN and may be identified by IP address, a port and a protocol), or a set or a subset of the abovementioned.

The term "Application Programming interface (API)" as used herein refers to a service, as described above, that enables a set of procedures that allows programmatic interaction between applications, i.e., control and access data of the other application.

The term "container" as used herein refers to a unit of software that packages up code with all its dependencies such that the software runs reliably and uniformly even when ported from one computing environment to another.

A connection is a record of a dependency between two assets, such that it makes it the case that (some or all) entities that are connected with the first asset connect also with the second asset. A complete connection record has at least three components: a connection type, a connecting resource, and a connected resource. The type of connection determines the type of connecting and connected resources that have that type of connection. Depending on the type, a connection may have additional attributes. Examples of connection types include DNS Type X connection, where X can be an A record, CNAME record, an MX record, Name Server (NS) record. Other examples include HTML script inclusion, HTML image inclusion, HTML hyperlink, etc.

A dangling connection is a connection where the connected asset referenced in the connection record does not exist or is not in use. For instance, a DNS "A" record that maps an FQDN to an IPv4 address constitutes a connection that is considered dangling if that IP address is not or is no longer assigned to any Internet host.

Organizations may be a target to cyber-attacks and malicious campaigns. Dangling connections may be one way that organizations are exposed to cyber-attacks. This is the case whenever the IP address or FQDN that's the target of a connection can be taken over.

Therefore, there is a need for a technical solution for organizations or Internet Service Provider (ISP) or other data resource providers (e.g. cloud providers) that may detect connections and identify dangling connections to alert the organizations before the systems of these organizations get attacked.

Moreover, organizations need a technical solution that will aid them to become aware of any risks that they're exposed to by having connections from and to assets, including dangling connections, or connections to third party assets that have vulnerabilities, or to assets having connections that are vulnerable. The needed technical solution should provide a view and monitor their public assets and for each asset determine its level of vulnerability and provide a view of the organizations' ecosystem.

A service provider needs a technical solution to assess if a public asset that is owned by the service provider, which has been "rented" or otherwise assigned for a particular use, in a particular way, to one of their customers, can safely be released and reassigned for another use by the same or different customer. There is a need for a computerized-method and computerized-system that will provide visibility as to any connection that might be pointing to any resource, and alerts about released resources that still have active connections pointing to them.

For example, in case of rented IP addresses, before releasing a rented IP address held by a customer for the use of the customer's system, the service provider for example may need a technical solution to detect connections, such as DNS A records, or any other web connections that use the rented IP address directly, or any other connections that are DNS-intermediated to this rented IP address.

In yet another example, in the process of registration of domain names, subdomains and Fully Qualified Domain Names (FQDN)s, before deregistering domain names, subdomain names or FQDNs, a service provider may need a technical solution to detect connections that would become potential attack vectors if the domain name will be deregistered or re-registered to a different business entity.

According to some embodiments of the disclosure, the connection types may include: an authoritative name-server, other name-servers that might participate in the resolution of DNS records, DNS records such as A, CNAME, NS, MX, SOA and hosts, IP addresses or IP address ranges that are listed in records like TXT, WHOIS email addresses and registrars. Loading objects (directly or indirectly via redirect), for example: CSS inclusion, Flash, Silverlight or Java applet object inclusion, font inclusion, Iframe inclusion, Image inclusion, script inclusion, media inclusion or specific connection for any type of object/resource that could be loaded by webpage or application. Other types of web connections that do not involve loading of an object include sending AJAX request, web-socket or socket connections, HTTP redirect to/from another host, hyperlink, hyperlink ping, and other meta references.

According to some embodiments of the disclosure, connections may include network connections. The network connection type may be classified by the TCP or UDP port or the common service that's assigned to that port. For example, a database server that receives queries on ports 3306 (MySql) or 5432(Postgres) can be the connected asset in a connection of type MySql, where the connecting asset can be identified with the requestor's IP address or FQDN.

FIG. 1 is a schematic illustration of a computerized-system 100 for detecting connections. In accordance with embodiments of the disclosure, detection of connections is performed by a computerized method in a computerized-system 100 comprising a processor 105, a data storage (e.g. connection table 150) and a memory 115, operating by the processor 105 a manager module 160 that may operate one or more modules to detect and collect connections to assets. The assets may be devices, hosts, cloud instances and networks.

In accordance with embodiments of the disclosure, the detected connections may be collected for organizations, Internet Service Providers (ISP)s, or any other resource providers.

Furthermore, in accordance with embodiments of the disclosure, the computerized-method and the computerized system 100 for tracking connections and preventing dangling connections to assets and from assets or its elements may be implemented in hardware, or software, or both, and may be deployed using any combinations of physical servers, virtual machines, containers, functions, etc. For example, it may be implemented as a cloud instance which may be launched by a web service such as Amazon Elastic Compute Cloud (Amazon EC2) or alternatively it may be implemented as one or more virtual machines each running multiple containers.

Furthermore, in accordance with embodiments of the disclosure, the computerized method and the computerized-system 100 for tracking connection and preventing dangling connections to assets and from assets, may be implemented as a collection of functions or elements.

Furthermore, in accordance with embodiments of the disclosure, the computerized system may have a Connection Table (CT) 150 for storing information about detected connections. The system may also have a user interface 170 including a set of APIs for accessing and controlling the CT 150.

Furthermore, in accordance with embodiments of the disclosure, the CT 150 may include details of source host, target host, connection type, first and last dates seen, and other information.

Furthermore, in accordance with embodiments of the disclosure, the computerized system may include one or more Data Collector (DC) components 130 that collect data for the computerized system, from which data connections may be inferred.

Furthermore, in accordance with embodiments of the disclosure, the computerized system may have one or more Connection Analyzer (CA) components 140. Some CA components 140 may be enabled to process data, which has been collected by the DC components 130, and to extract connections and store them in the CT 150. Other CA components 140 may interact with and analyze data that's available online and extract connections directly from there.

Furthermore, the computerized system may optionally have one or more Connection Verifier (CV) components 180 that can verify the current existence of connections of specific types.

Furthermore, in accordance with embodiments of the disclosure, different DC components 130 may be configured to collect data from:

(i) static resources such as data storages or files storing one or more types of logs 270, for instance, web server logs;

(ii) network traffic capture devices (e.g. sniffers 260) that capture internet traffic in e.g., pcap files; and (iii) from other peered systems 100 such as the computerized-systems for detecting one or more connections to assets and from assets via the Internet. The data storages of the static resources may be embedded in the computerized-system or fetched upon a DC component 130 request.

Furthermore, in accordance with embodiments of the disclosure, different DC components 130 may be configured to collect data by probing APIs or other services, for instance, in order to discover the public IP address of the host the DC 130 itself is running on.

Furthermore, in accordance with embodiments of the disclosure, the data storages storing one or more types of external logs may be data storage of connections, Internet traffic logs 270 of network level, Internet traffic logs 270 of application level, storage of DNS records, or logs of DNS queries.

Furthermore, in accordance with embodiments of the disclosure, captures of live traffic may include packets belonging to both incoming sessions and outgoing sessions.

Furthermore, in accordance with embodiments of the disclosure, a DC 130 in one computerized system may connect to another computerized system for tracking connections and preventing dangling connections to assets and from assets through its API and fetch connections from the latter to be recorded in the former computerized system for tracking connections and preventing dangling connections to assets and from assets.

Furthermore, in accordance with embodiments of the disclosure, the processor may operate one or more Connection Analyzer (CA) components 140 that may receive the data from the one or more DC components 130 and may extract connection related information from data files and write it to the connection table 150.

Furthermore, in accordance with embodiments of the disclosure, each CA 140 may be configured to receive data from a specific type of DC component 130.

Furthermore, in accordance with embodiments of the disclosure, each one of the one or more CA components 140 may be configured to parse preconfigured formats of data and may yield preconfigured connection types.

Furthermore, in accordance with embodiments of the disclosure, each one of the one or more CA components 140 may receive all data, but only some CA components 140 may be able to provide the connection types, because each CA component 140 may be configured to receive different data formats.

Furthermore, in accordance with embodiments of the disclosure, each one of the one or more CA components 140 may receive data in a preconfigured data format, but each analyzer may be configured to yield a single type of connection from the received data.

Furthermore, in accordance with embodiments of the disclosure, one or more CA components 140 may add or update DNS connection records in the CT 150, by actively sending various DNS queries for the host names recorded in the data collected by any DC component 130. Examples of such connections include, but are not limited to, CNAME connections from any of the FQDNs found in an input data file to each one of the FQDNs returned by a DNS server for a DNS CNAME query. Similar examples include DNS NS and MX connections.

Furthermore, in accordance with embodiments of the disclosure, one or more CA components 140 may add or update web connections by crawling HTML webpages, served by FQDNs, recorded in the files fetched by any DC component 130. The CA components 140 will infer and record web connections by analyzing the HTML code on the webpages loaded.

Furthermore, in accordance with embodiments of the disclosure, the manager module may optionally operate one or more Connection Verifier components (CV) 180 which may be called by CA components 140 to verify connection types that have been analyzed by the one or more CA components 140 according to data retrieved from the Internet.

Furthermore, in accordance with embodiments of the disclosure, the Connection Verifier component 180 may be connected to the cloud and may be implemented outside the computerized-system 100.

Furthermore, in accordance with embodiments of the disclosure, the Connection Verifier component 180 may read and annotate the connection table 150 and may probe assets, in the connection table 150, to verify that connections are still current.

Furthermore, in accordance with embodiments of the disclosure, the manager module 160 may orchestrate workflows from the one or more DC components 130 to the one or more CA components 140 to connection verifiers 180.

Furthermore, in accordance with embodiments of the disclosure, the manager module 160 may optionally operate an event manager 165. The event manager 165 may send alerts to report dangling connections or verify connections, based on data in the connections table 150. The alerts may be sent immediately when dangling connections are detected or periodically, e.g. every hour or day or every preconfigured period of time to report the dangling connections to identified organizations.

Furthermore, in accordance with embodiments of the disclosure, for security purposes, the manager module 160 may optimally operate the events manager component 165 to analyze the connection details in the connection table 150 to yield connections statistics and perform ranking of assets according to connections statistics which may reflect the reputation or importance of the assets. The importance of the assets may be determined according to the number of other assets which are dependent or directing to it.

Furthermore, in accordance with embodiments of the disclosure, the interface 170 may include an API for getting connection data, as well as updating the data.

Furthermore, in accordance with embodiments of the disclosure, the manager module 160 may identify a preconfigured situation and accordingly may add or remove components (e.g., a DC 130 or CA 140) based on some rules.

Furthermore, in accordance with embodiments of the disclosure, the manager module 160 may implement a logic for the deployment or removal of DC components 130, based on the duration of time in which data has been collected or the amount of data that has been collected and/or some facet of the connections that were extracted from the data collected by the DC component 130. Specifically, the manager module 160 may implement a logic for the deployment of a "honeypot" resource, with one or more DC components 130, using an IP address or FQDN that's of interest to the organization using the system, in order to determine if and which connections point to that IP address and/or FQDN. Similarly, the manager module may implement a logic for deploying one or more DC components 130 on an already-deployed resource, in order to record the connections pointing to that resource.

FIGS. 2A to 2D are schematic illustrations of networks deploying computerized system 100 for detecting dangling connections, according to an embodiment of the disclosure.

Figure 2A:
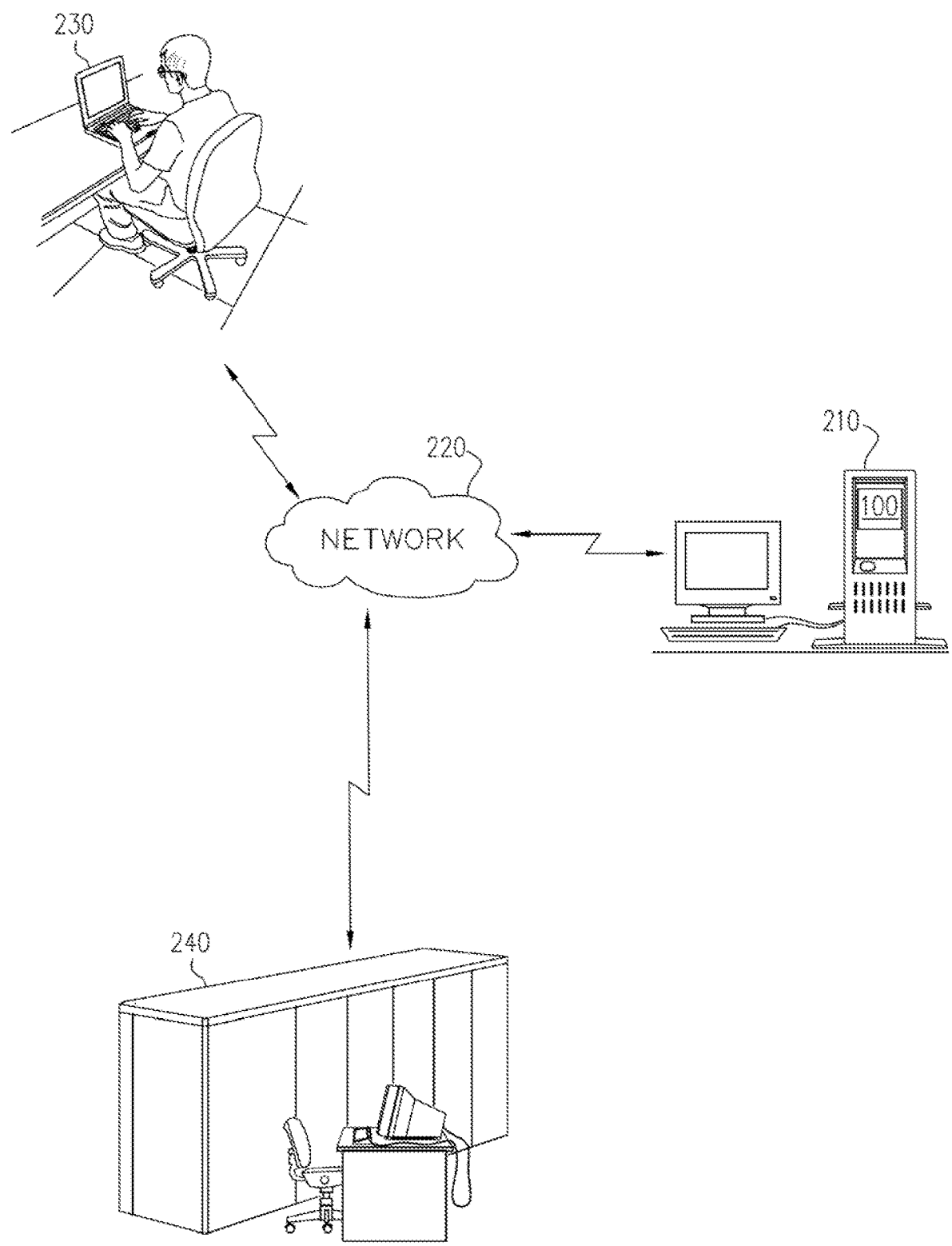
FIGS. 2A to 2D are schematic illustrations of networks deploying a computerized system for detecting dangling connections, according to an embodiment of the disclosure.

In an embodiment of the disclosure, as shown in FIG. 2A, a resource server 210 may have served to provide services to workstations 230 and/or other servers 240 over a network 220 (e.g. the Internet or an intranet). Optionally, when the resource server 210 is defined as unnecessary it is assumed that all references to the resource server 210 have been updated or canceled. The owner of resource server 210 is interested in releasing and/or reallocating the domain name (e.g. an FQDN) and/or IP address allocated to the resource server 210. In an embodiment of the disclosure, computerized system 100 is executed by the resource server 210 to identify if any connections still attempt to access the resource server 210, before releasing the domain name and/or IP address.

Figure 2B:
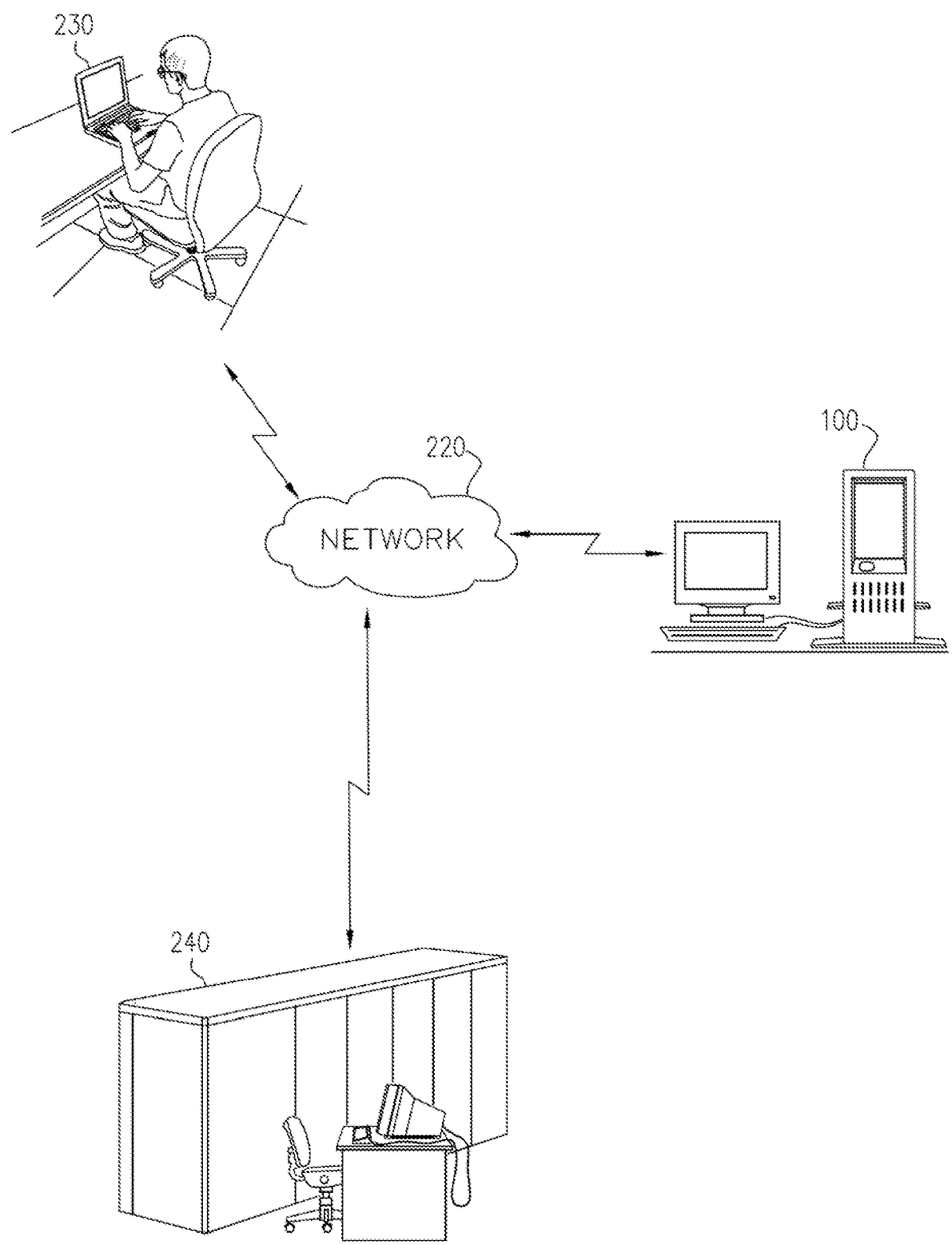

In an alternative embodiment of the disclosure, as shown in FIG. 2B, resource server 210 may have been shut down and a dedicated computerized system 100 may be deployed to replace resource server 210. The dedicated computerized system 100 is configured to use the domain name and/or IP address of resource server 210 to serve as a "honeypot" and detect access attempts to the previously deployed resource server 210, before releasing the domain name and/or IP address.

Figure 2C:
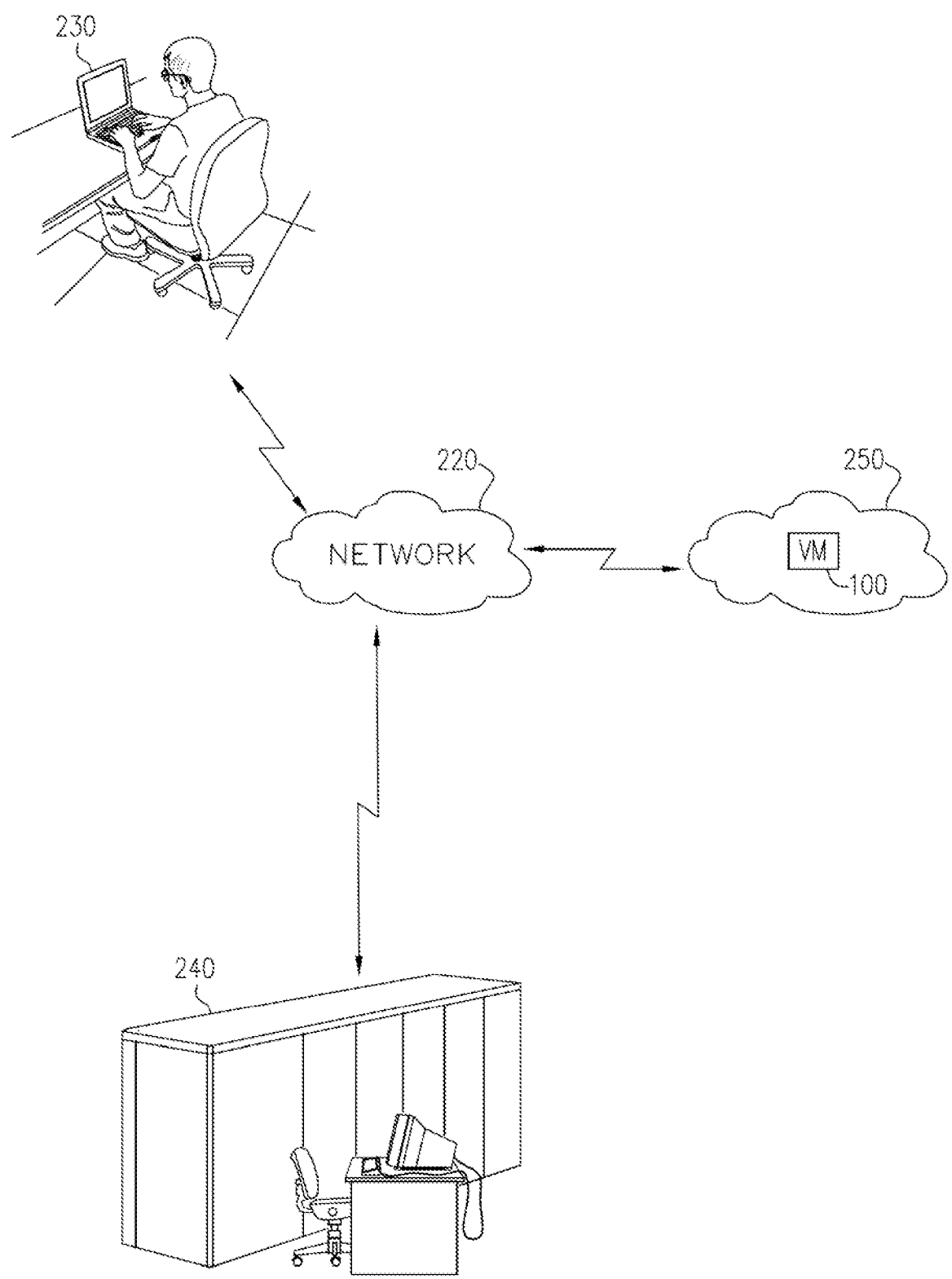

In an alternative embodiment of the disclosure, as shown in FIG. 2C, resource server 210 may have been shut down and computerized system 100 may be implemented as a virtual machine (VM) executed on a cloud server 250. Optionally, the domain name and/or IP address are configured to point to the virtual machine, so that access attempts to these assets will be directed to computerized system 100.

Figure 2D:
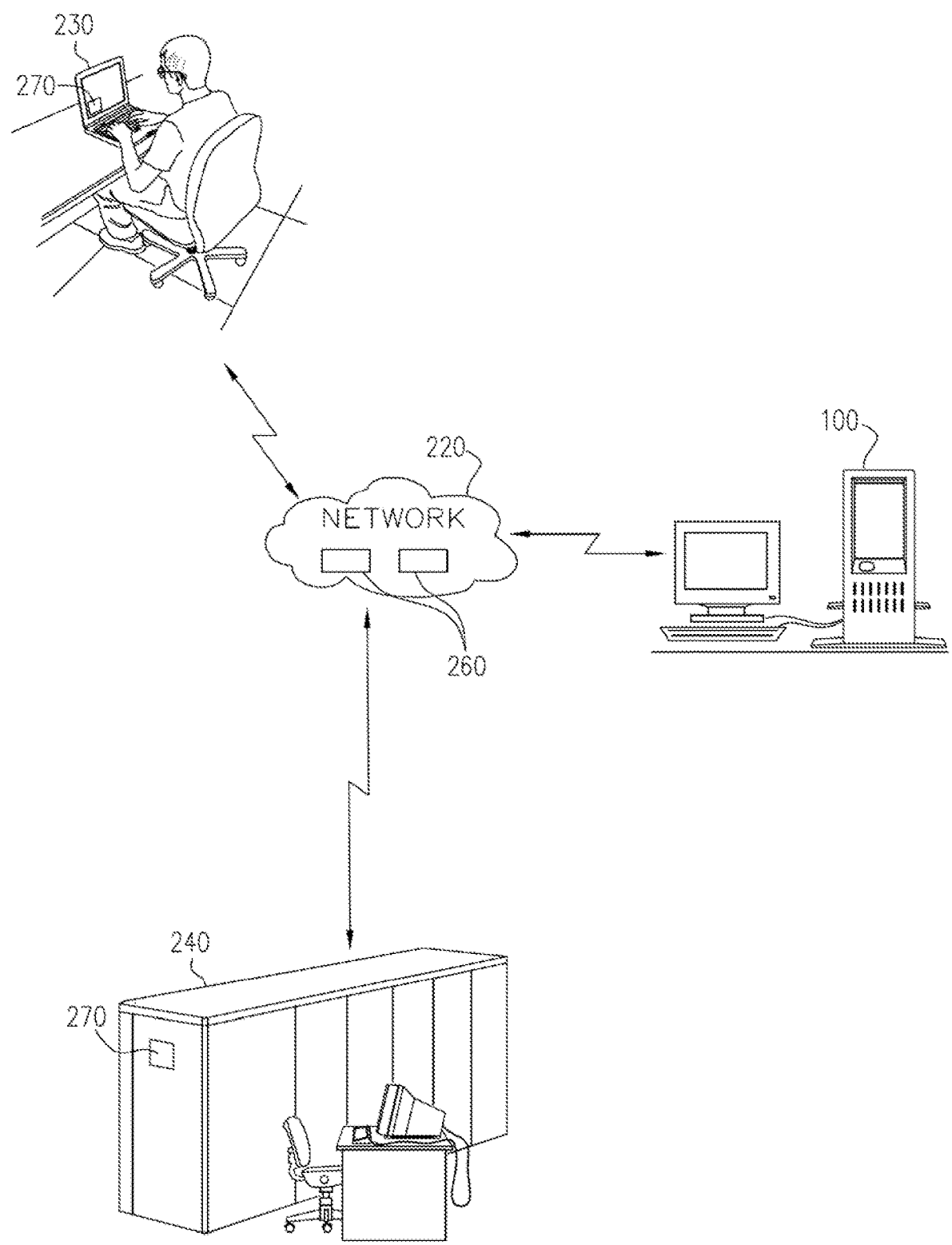

In an alternative embodiment of the disclosure, as shown in FIG. 2D, computerized system 100 may be implemented as a dedicated server or an application on a computing device, wherein computerized system 100 is configured to retrieve information from network sniffers 260 that monitor network traffic and/or retrieve information from log files 270 from various workstations 230 or servers 240 regarding network communications, for example log file from domain name servers or ISP servers regarding attempts to access the specific domain name or specific IP address previously allocated to resource server 210. Alternatively, or additionally, DC components 130 on computerized system 100 may probe API's of workstations 230 or servers 240 requesting communication information related to access attempts related to resource server 210.

In an embodiment of the disclosure, data collectors (DC) 130 are configured to collect communication data in various forms, for example:

1. Direct access attempts to resource server 210 and/or computerized system 100;
2. Communication logs 270 (e.g. of an ISP server or domain name server);
3. Network traffic capture devices (e.g. sniffers 260) positioned at key locations;
4. Probing API's, for example querying an ISP server or other specific servers 240 or workstations 230; and
5. Performing a general web search, for example searching for web pages referencing a specific domain name (DNS) or specific IP address.

Optionally, the collected data is analyzed by the one or more connection analyzers (CA) 140 to identify access attempts to resource server 210 and information relating to the identity of the accessor. In an exemplary embodiment of the disclosure, the identified information is stored in connection table 150.

As exemplified in FIGS. 2A to 2D, computerized-system 100 may be implemented as a software application running on any combination of one or more physical servers, virtual machines and/or containers. A virtual machine may be launched in the cloud having a domain name of the detected asset and an attributed IP address.

According to some embodiments of the disclosure, the mechanism may optionally shut down the launched virtual machine if a connection attempt to resource server 210 has not occurred during a preconfigured time period.

In some embodiments of the disclosure, a single computerized system 100 can serve to identify connections for multiple resource servers 210 simultaneously.

According to some embodiments of the disclosure, the provided mechanism, such as computerized-system 100 may be used in various ways. For example, the mechanism may be used as a connection honeypot, which may spawn many instances and collect information.

According to some embodiments of the disclosure, when the mechanism, such as computerized-system 100, is used as a connection honeypot, it may allocate a resource over a network 220, e.g., the Internet, or a specific cloud or hosting provider. When the mechanism, such as the computerized-method, which may be implemented by computerized-system 100, is used as a connection honeypot, it may collect connections for a preconfigured time period.

According to some embodiments of the disclosure, assets that are connected to the allocated resource may suffer from dangling connections and may be exposed to security risks, depending on the connection type. The security risks are detailed below.

In some embodiments of the disclosure, the mechanism, such as the computerized-method which may be implemented by computerized-system 100, may be used to track connections before a resource server 210 is about to be released. The renter or tenant may deploy a DC component 130 or may deploy a whole computerized-system 100 into resource server 210 (e.g. as shown in FIG. 2A). The computerized-system 100 may then collect connections for a preconfigured period of time and then it may display a list of the connections to the user (i.e., renter or tenant) so that they can make an informed decision on if and when to release this resource.

According to some embodiments of the disclosure, when resource server 210 itself is no longer active, but before it's released, an implementation of the computerized-system 100 as a honeypot may be deployed with the resource IP address or FQDN that may allow connections to be detected (e.g. as shown in FIG. 2B).

According to some embodiments of the disclosure, the computerized-system 100 may immediately provide an alert when identifying a dangling connection and prevent further processing. Alternatively, when installed in an existing server, system 100 may as a first step shut down components of the computerized-system and only execute a DC component 130 and a CA component 140 to collect and analyzes the connections. Then system 100 will either release the asset completely if no connections are detected during a preconfigured time period, and/or provide alerts about the detected connections.

According to some embodiments of the disclosure, the mechanism, such as the computerized-method which may be implemented by computerized-system 100, may be used for secure release of an asset to prevent release of resources unless no connections are detected during a preconfigured time period, and only then the asset may be released or otherwise alert the user regarding connected assets.

According to some embodiments of the disclosure, the provided mechanism, such as computerized-system 100 may be used for secure management of assets. When an asset is created or a preconfigured time after it is created it may use the computerized-system 100 by launching one or more implementations of the computerized-system 100 to collect by operating one or more data collector (DC) components 130 and analyze by operating one or more connection analyzer (CA) components 140, internet traffic to the asset and to extract connections.

Optionally, the extracted connections are stored in a connection table 150.

According to some embodiments of the disclosure, some of the collected data is in the network level and some of the collected data is in the application level, e.g., application logs. Accordingly, each of the one or more DC components 130, may be used for a different type of access having a different data format.

According to some embodiments of the disclosure, each of the connections which may be stored in the connection table 150 may include:

(i) A connection type;
(ii) A connecting host;
(iii) A connected host; and
(iv) Metadata.

The metadata may include: (i) a date when the connection was first seen; and (ii) a date when the connection was last seen and (iii) additional information about the connection if applicable.

According to some embodiments of the disclosure, the source of the data of the one or more DC components 130 may be a network packet capture device (e.g. a sniffer 260) or an application programming interface (API) that captures network traffic.

According to some embodiments of the disclosure, the source of the data of the one or more DC components 130 may be a log 270 of a web server from which connections to or from the resource server 210 may be identified.

According to some embodiments of the disclosure, the source of the data of the one or more DC components 130 may be another computerized system 100 deployed in the network 220 (e.g. one computerized system 100 may share information with another computerized system 100). Optionally, in a broad form one or more computerized systems 100 may continuously crawl the web, identify and store (in CT 150) information about connections between resources, such as one web resource referring to another or referring to a specific resource server 210. Then a resource server 210 may query connection tables (CT) 150 from the one or more computerized systems 100 and receive a map or list of connections related to the resource server 210.

According to some embodiments of the disclosure, a DC component 130 may collect data by actively querying an API or another service in order to gain additional information about the resource it is installed on. For instance, it may use a cloud API or some other open service to periodically find out and record the public IP address used by the host it is installed on.

According to some embodiments of the disclosure, the one or more DC 130 components may be is installed on the actual resource of interest that is answering requests to communicate with the resource server 210 or asset (e.g. the IP address or the FQDN).

According to some embodiments of the disclosure, there is no current service configured to use the IP address or the name, and so a "honeypot" configuration may be set up to answer those requests (see FIG. 2B).

According to some embodiments of the disclosure, the one or more DC components 130 may be installed on a resource that is configured as the recipient of a network tapping device. That resource receives copies of traffic destined to the one or more resources of interest.

According to some embodiments of the disclosure, the one or more DC 130 may be a stand-alone module that is installed separately from the computerized-system 100.

According to some embodiments of the disclosure, the one or more DC 130 may be installed on the same resource as the whole system.

According to some embodiments of the disclosure, interface 170 is made up from a set of APIs and may include an API for retrieving the connection information from the connection table 150. Optionally, the interface enables users to query the connection table and retrieve information locally or remotely.

In some embodiments of the disclosure, the connection table 150 provides the most recent active connections to the asset in the past preconfigured time interval (e.g. a number of days). The connection data is used to alert the renter or organization releasing the asset if there is a problem or to prevent the shut down or release in case the analysis of the recent connections determines that other assets may be hurt by the action.

According to some embodiments of the disclosure, the connection table 150 may be a database, which includes information about hosts. The connection table 150 may also include information about the assets, for example, asset type and a set of attributes derived from the type of asset.

According to some embodiments of the disclosure, the mechanism, such as the computerized-method implemented by computerized-system 100, may operate one or more Data Collector (DC) components 130 with static or dynamic, potentially external data feeds to detect connections and may forward it to one or more CA components 140 for analysis and a connection verifier 180 may verify that the detected connections are still alive.

According to some embodiments of the disclosure, the connection verifier 180 may read and annotate the connection table 150 and may probe assets listed in the connection table to verify that connections are still current.

According to some embodiments of the disclosure, in the process of analyzing log data retrieved by a DC component 130, a connection analyzer components 140 may issue a sequence of DNS queries for any FQDN that's a candidate to be part of a connection, and detect and store additional DNS connections in the connection table 150 for the FQDN.

According to some embodiments of the disclosure, a connection verifier 180 might be called on by a CA component 140 or the manager module 160, to crawl a website and load pages from a connecting resource, in order to verify the exact type and ascertain an HTML connection.

According to some embodiments of the disclosure, the computerized-method, which may be implemented by computerized-system 100, may operate one or more DC components 130 to track connections to and from assets and verify them. If after a preconfigured period of time, no active connections to the asset are detected, then the asset may be released. When connections are detected, then depending on the user's configuration the asset may be released or kept.

According to some embodiments of the disclosure, one or more DC components 130, may collect data by querying various services, such as DNS servers.

According to some embodiments of the disclosure, one or more DC components 130, may collect data by reading or copying log files 270 of various components, for instance, WAFs, load balancers, proxies, or web.

According to some embodiments of the disclosure, one or more DC components 130, may collect data by reading or copying network activity capture files generated by network packet capture devices.

According to some embodiments of the disclosure, one or more DC components 130 track connections to and from assets and may receive data from other computerized systems 100 via network 220.

For example, a data collector (DC) 130 of a type that collects output from a network traffic capture device on some resource of interest, may include data of the following form: "time":"[27/Aug/2020:07:40:44+0000]", "remote_address":"14.207.24.71", "SN1":"www.mysoftware.com"}. The DC 130, may forward the collected data to one or more Connection Analyzer (CA) components 140. Additional metadata about the Host the DC 130 is installed on indicates that it uses public IP address 52.164.206.56.

The CA components 140, may be configured to establish that SNI entries seen in logs of incoming Transport Layer Security (TLS)requests are FQDNs with a DNS resolved to the public IP address associated with the VM the DC 130 is installed on. It will thus call on a connection verifier component 180, that operates by sending a DNS query, e.g., query of type A, for www.mysoftware.com: the DNS response may look like
id 64413
opcode QUERY
rcode NOERROR
flags QR RD RA
;QUESTION
www.mysoftware.com IN A
;ANSWER
www.mysoftware.com 3599 IN A 104.215.95.187
www.mysoftware.com 3599 IN A 52.164.206.56
;AUTHORITY
;ADDITIONAL Then, the Connection Verifier may forward the response to the Connection Analyzer CA 140, as one of the entries in the ANSWER section matches the known public IP address of the Host, the Connection Analyzer 140 will add an entry to the connection table 150 where the connected-to asset is the IP address 52.164.206.56, the connecting asset is the FQDN www.mysoftware.com and the connection type is DNS-A.

In yet another example, of a web connection: the DC 130 may be of type "incoming live traffic (decrypted)": {"time": "[27/Aug/2020:07:40:57+0000]", "req": "GET/some/script.js HTTP/1.1", "remote_address": "170.223.69.2', "host": "boxed.entity.com", "referrer": "https://www.site.com/page/"}. The DC 130 may forward the collected data to a Connection Analyzer (CA) 140.

According to some embodiments of the disclosure, the CA 140, may determine that the webpage https://www.site.com/page/loads a script from boxed.entity.com which is DNS connected to the boxed Entity, i.e., the launched virtual machine. The connection verifier 180 of web script inclusion type, may load the webpage https://www.site.com/page/over the Internet and check whether this webpage loads a script from boxed.entity.com i.e., the launched virtual machine.

According to some embodiments of the disclosure, each CA 140 may be configured to manage a different data type.

According to some embodiments of the disclosure, the data that may be forwarded to be stored in a connection table 150 may be: From: www.site.com, to: boxed.entity.com, type: script inclusion, info: https://www.site.com/page/->https://boxed.entity.com/some/script.js.

According to some embodiments of the disclosure, the mechanism, such as the computerized-method, implemented in the computerized-system 100, may determine whether a removal or change of an asset may hurt or affect the performance or behavior of any other assets which are connected to it. Namely, organizations might want to verify that removing an asset will not affect other assets or components in their systems.

According to some embodiments of the disclosure, for security purposes, connections statistics may be generated and may be used to create ranking mechanism or to define a rank of the importance of the assets. For example, when removing a cloud instance or avoiding renewal of a domain name, somebody else may register the cloud instance or domain name. Thus, having someone else registered for the cloud instance or domain name and controlling the other side of a connection may expose the asset on the first side to security issues. For example, if the asset on the first side is a website loading resources from the other assets, then, when the cloud instance or domain names will be registered by someone else then malicious resources may be loaded to the website.

According to some embodiments of the disclosure, when releasing an instance or performing some other changes, an alert about the connected assets, as they might be affected by it, may be sent. The information may be analyzed immediately or periodically, for example, by analyzing logs. The information about the connected assets may be retrieved from the connection table, such as connection table 150 by an event manager component 165.

According to some embodiments of the disclosure, the detected connections may be used to find assets or networks or devices that are connected to or relying on non-existing or abandoned assets, by spawning an instance, analyzing the traffic and serving data.

According to some embodiments of the disclosure, the implementation of the mechanism such as DC 130, or the whole computerized-system 100, may be either on a network device, or a Proxy, or a Web Application firewall, or on a dedicated VM or container acting as a honeypot, or on a software module installed on the resource of interest (that resource to which the IP address in question is assigned, or that resource that currently receives traffic destined for the FQDN in question).

According to some embodiments of the disclosure, the DC 130 may collect data such as Internet traffic and may get data from static sources such as files or dynamically updated sources, such as data feeds.

According to some embodiments of the disclosure, the processor 105 may operate Connection Analyzer (CA) components 140 that may receive the data from DC components 130 and analyze it to yield a connection table 150. The connection table 150 may include details of connections.

According to some embodiments of the disclosure, the connection table 150, may include details of source host, target host, connection type, other information and the like. For example, the source host may be 'a.b.com', the target host may be 'cloud.instance.net' and the connection type may be script, Canonical Name (CNAME) and the like.

According to some embodiments of the disclosure, the other information in the connection table 150, may be configurable and may be for example, https://a.b.c/path/?querystring->https://cloud.instance.net:80/path/script.js and date seen first, date seen last, total of number of times seen and number of times seen in the past preconfigured time. Yet, in another example, c.d.com CNAME cloud.instance.net and date seen first, date seen last, total of number of times seen and number of times seen in the past preconfigured time.

According to some embodiments of the disclosure, the manager module, such as manager module 160, may optionally operate one or more connection verifier components 180, which may be connected to one of the one or more CA components 140, to verify connection types.

According to some embodiments of the disclosure, the manager module 160 may orchestrate workflows from the one or more data collectors 130 to the one or more connection analyzers 140 to connection verifiers 180.

According to some embodiments of the disclosure, the connection types may be web connections such as script or image inclusion connections. In this type of web connections, one asset refers web-clients to load some objects from a connected asset. The web object may be a script, an image, a media file, a flash object, an applet, Cascading Style Sheets (CSS) object, other pages, etc. that are loaded from other pages. In that case the former asset is the connecting asset, the latter is the connected asset and the type may correspond to the specific type of HTML tag under which the connected asset is referenced <script> for instance.

Optionally, HTTP requests or responses of the connecting asset may be analyzed and/or the HTML of the connecting asset may be analyzed to identify a script that includes a connection to a connected asset.

According to some embodiments of the disclosure, the connection type may correspond to a specific DNS record type, for example "A" or "NS" or "MX" or "CNAME". An asset may be analyzed by the computerized-system 100 according to DNS records in which its IP address or FQDN are mentioned, which may be verified by querying public or private DNS servers or other resources (including reverse DNS lookup services).

According to some embodiments of the disclosure, DNS connections may be inferred indirectly by analyzing traffic logs, or directly, by sending a series of DNS queries: For example, if the analysis of network traffic yields that the asset has been accessed as a mail server of a domain, then it may be inferred that a Mail Exchange (MX) record of the domain points at this asset. A Connection Verifier, such as one or more Connection Verifier components 180, may then be invoked to send DNS queries and confirm this. Similarly, if the HTTP traffic arrives with hostname, or HTTPS with Server Name Indication (SNI) it may be inferred that either a DNS 'A' connection exists between the FQDN in the SNI or hostname, and the IP address of the host, or else a chain of DNS 'CNAME' records connects that FQDN with some other FQDN that has a DNS 'A' connection to the IP address of the host.

According to some embodiments of the disclosure, a Connection Verifier 180, may then be invoked to verify the set of DNS connections that tie the FQDN and IP in question.

According to some embodiments of the disclosure, the computerized-system 100 may detect network security scans on the asset, and record in the connection table 150 the relationship between the scanner(s) and the asset as a specific connection of type "scanner", and when the asset is released to notify the organization about it so the organization may stop consuming the service for the particular asset.

According to some embodiments of the disclosure, the connection analyzer 140 may aggregate data about connections and record the aggregate information in connection table 150, to indicate that the monitored asset provides a service to multiple assets. For example: by detecting incoming DNS queries from multiple sources, an aggregate connection of type "Serve DNS" is created; the host acts as a DNS resolver for other hosts. The computerized-system 100 may operate DC components 130 to collect data of outgoing internet traffic and may operate CA components 140, to analyze the collected data and to interpret that the monitored asset is a resolver (if the asset performs iterative querying), or to interpret that the monitored asset is authoritative (replies with an answer and did not ask another server about it), or just a node in the DNS trust tree which answers to ask another server.

According to some embodiments of the disclosure, the information available through the APIs of interface 170 can be used to list connections that would become dangling if the resource of interest is removed.

According to some embodiments of the disclosure, name indications such as SNI (in TLS) and hostname (in HTTP) may be recorded in files collected by one or more Data Collectors 130 and analyzed by Connection Analyzers 140 to be resolved to the IP address of the resource of interest. This information may be useful when removing the resource of interest because that removal may require a change in the HTML code on the asset that originates the connection so as to prevent a dangling web connection.

According to some embodiments of the disclosure, the manager module 160 may collect data from the connection table 150 that will allow it to associate any resource of interest with an account or organization that that resource belongs to. According to some embodiments of the disclosure, the manager module 160 may operate an event manager 165 to notify specific organizations. The manager module 160 may be configured to identify to which account or organization any resource of interest belongs to. The manager module 160 may use that to, for example direct alerts to that organization. Accordingly, the event manager 165 may send alerts or verify connections, based on data in the connection table 150 in real-time, immediately when dangling connections are detected or in a preconfigured period of time to report it to the identified organizations.

According to some embodiments of the disclosure, the manager module 160 may provide an indication if the asset may be securely released or not. Secure release can be configured as a selectable security service that aims to prevent the release of cloud resources if there are sensitive connections to a resource that might be susceptible to abuse, should the resource be released and its name or IP address become available for rent by another user. Optionally, a service provider (e.g. a domain name provider or IP address provider) provides the user with an option to select if to activate a secure release process before releasing an asset or to just release the asset without checking if it is safe to release the asset. In some embodiments of the disclosure, specific accounts automatically activate a secure release procedure before releasing an asset.

Some examples of secure release include:
1) If the resource to be released was already monitored by system 100 for a sufficient amount of time, then no additional deployment is necessary, and secure release would either halt the release or allow it depending on the known connections to that resource;
2) Alternatively, the secure release service will automatically enable logging on to the resource itself (if logging was not previously enabled) and deploy a data collector 130 to collect and transmit connection data: For example, when a user indicates that they intend to release an AWS S3 bucket, or an Azure Storage account, this is the process that may be followed, on the bucket itself, before deleting any of the contents of the bucket. The data collector 130 will then transmit connection data either to an already existing system 100 or to a new system 100 that would be deployed to analyze the data
3) Alternatively, the service will allow completing the deletion of the resource, but followed by the immediate deployment of another, identically named and IP addressed resource of the same type, as a honeypot. Such a honeypot will be configured to log network activity, and will be deployed together with a data collector 130 to collect and transmit the connection data either to an already existing system 100 or to a new system 100 that would be deployed to analyze the data. This method is applicable to AWS S3 buckets, Elasticbeanstalk, EKS services, EC2 instances and the analogous services of other cloud providers.

According to some embodiments of the disclosure, computerized-system 100 is deployed to serve as a honeypot. Optionally, one or more DC components 130 or the whole computerized-system 100 is installed as the honeypot. Optionally, the computerized-system 100 may be configured to decide, based on preconfigured rules, when to shut down and destroy the honeypot. More generically, in any of the ways of installing a DC component 130, the computerized-system 100 may have preconfigured rules that determine if and when enough data has been collected (or when no data or not enough data is collected, so the honeypot does not reach some effectiveness level) (maybe, for the time being) and stop the DC component 130 from collecting additional information. In some embodiments, the data collection will be ongoing and periodic. The DC component 130 may collect connections one day a week, or once a month.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such an alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure. While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

We claim:

1. A computerized system for detecting connection dependencies in the Internet, comprising:
    one or more data collectors configured to collect data from the Internet;
    one or more connection analyzers configured to analyze the data and extract connection dependencies; wherein the connection analyzer searches in the data for connections of specific types, including DNS A records, HTML script inclusions and HTML hyperlinks, the analyzer extracts connection dependencies from the data, the connection dependencies including a connecting resource that has a dependency of the specific type of a connected resource;
    a connection table that stores information about the connection dependencies;
    an interface that is configured to provide access to the connection table to retrieve a list of connecting resources that depend on accessing a given connected resource.

2. The computerized system of claim 1, further comprising a connection verifier that is configured to verify the existence of connecting resources or connected resources listed in the connection table.

3. The computerized system of claim 1, wherein each of the one or more data collectors is configured to collect data from a different type of source.

4. The computerized system of claim 1, wherein one data collector collects data from a sniffer monitoring live network traffic.

5. The computerized system of claim 1, wherein one data collector collects data from a log file recorded on a remote server.

6. The computerized system of claim 1, wherein the computerized system is configured to be deployed on a resource server and record connecting resources attempting to connect with the resource server.

7. The computerized system of claim 1, wherein the computerized system is configured to assume the identity of a resource server and record connecting resources attempting to connect with the resource server.

8. The computerized system of claim 1, wherein the computerized system is configured to be executed by a virtual machine on a cloud server, assume the identity of a resource server and record connecting resources attempting to connect with the resource server.

9. The computerized system of claim 1, wherein each connection analyzer is configured to parse a different data format.

10. The computerized system of claim 1, wherein each connection analyzer is configured to handle data from a different data collector.

11. The computerized system of claim 1, wherein the computerized system is configured to identify dangling connections by posing and accepting communications instead of the given connected resource.

12. The computerized system of claim 11, wherein the computerized system is configured to pose as the given connected resource for a preconfigured time period.

13. The computerized system of claim 12, wherein the computerized system is configured to send an alert upon discovering a dangling connection.

14. The computerized system of claim 12, wherein the computerized system is configured to send an alert reporting dangling connections periodically or after a preconfigured period of time.

15. The computerized system of claim 1, wherein the computerized system is configured to serve as a secure release service that provides a recommendation if a resource can be released without posing a threat to resources of a user.

16. A method of detecting connections dependencies in the Internet with a computerized system, comprising:
    collecting connection data from the Internet using one or more data collector modules;
    analyzing the connection data with one or more connection analyzer modules and extracting connection dependencies, wherein the connection analyzer searches in the data for connections of specific types, including DNS A records, HTML script inclusions and HTML hyperlinks, the analyzer extracts connection dependencies from the data, the connection dependencies including a connecting resource that has a dependency of the specific type of a connected resource;
    storing the connection dependencies in a connection table;
    providing access to the connection table with an interface to enable retrieving a list of connecting resources that depend on accessing a given connected resource.

17. The method of claim 16, wherein the computerized system is configured to identify dangling connections by posing and accepting communications instead of the given connected resource.

18. The computerized system of claim 17, wherein the computerized system is configured to pose as the given connected resource for a preconfigured time period.

19. The computerized system of claim 18, wherein the computerized system is configured to send an alert upon discovering a dangling connection.

20. A non-transitory computer readable medium comprising an executable program to perform the method of claim 16.

* * * * *